US012729562B2

(12) United States Patent
Kölliker et al.

(10) Patent No.: US 12,729,562 B2
(45) Date of Patent: Sep. 8, 2026

(54) KEY FOR AN ELECTROMECHANICAL LOCKING DEVICE

(71) Applicant: DORMAKABA SCHWEIZ AG, Wetzikon (CH)

(72) Inventors: Marcel Kölliker, Wetzikon (CH); Markus Zahner, Wetzikon (CH); Dominik Laib, Wetzikon (CH)

(73) Assignee: DORMAKABA SCHWEIZ AG, Wetzikon (CH)

( * ) Notice: Subject to any disclaimer, the term of this patent is extended or adjusted under 35 U.S.C. 154(b) by 0 days.

(21) Appl. No.: 19/111,858

(22) PCT Filed: Sep. 20, 2023

(86) PCT No.: PCT/EP2023/075959
§ 371 (c)(1),
(2) Date: Mar. 14, 2025

(87) PCT Pub. No.: WO2024/061977
PCT Pub. Date: Mar. 28, 2024

(65) Prior Publication Data

US 2026/0009262 A1 Jan. 8, 2026

(30) Foreign Application Priority Data

Sep. 21, 2022 (EP) .................................... 22196965

(51) Int. Cl.
*E05B 19/04* (2006.01)
*E05B 17/10* (2006.01)
*E05B 47/00* (2006.01)

(52) U.S. Cl.
CPC ............ *E05B 19/04* (2013.01); *E05B 17/103* (2013.01); *E05B 47/0001* (2013.01); *E05B 2047/0063* (2013.01); *E05B 2047/0084* (2013.01)

(58) Field of Classification Search
CPC .... E05B 19/04; E05B 17/103; E05B 47/0001; E05B 2047/0063; E05B 2047/0084
See application file for complete search history.

(56) References Cited

U.S. PATENT DOCUMENTS

2008/0223094 A1* 9/2008 Andersson .............. E05B 19/04 70/393
2013/0283868 A1 10/2013 Morehart et al.

FOREIGN PATENT DOCUMENTS

CN 101194292 A 6/2008
CN 202324840 U 7/2012
(Continued)

OTHER PUBLICATIONS

International Search Report for Application No. PCT/EP2023/075959, dated Jan. 5, 2024, 2 pages, English translation.
(Continued)

*Primary Examiner* — Christine M Mills
*Assistant Examiner* — Christopher F Callahan
(74) *Attorney, Agent, or Firm* — CANTOR COLBURN LLP

(57) ABSTRACT

A key for an electromechanical locking device, wherein a longitudinal axis, a width axis and a thickness axis are defined perpendicular to each other, with a key bow and with a key shank projecting from the key bow along the longitudinal axis for insertion into the locking device, wherein the key bow includes an electrical energy storage device and/or electronics, wherein the key bow includes a frame in which the energy storage device (85) and/or the electronics is received, wherein the frame is rigidly connected to the key shank, and wherein the frame has at least one grip region which forms a top surface of the key bow for a user to grasp.

12 Claims, 8 Drawing Sheets

(56) References Cited

FOREIGN PATENT DOCUMENTS

| | | | | |
|---|---|---|---|---|
| DE | 19849397 | A1 | 5/2000 | |
| EP | 1327734 | A1 * | 7/2003 | ............... G05G 1/02 |
| EP | 1899924 | B1 | 8/2017 | |
| GB | 2319803 | A | 6/1998 | |
| WO | 2013067738 | A1 | 5/2013 | |

OTHER PUBLICATIONS

Written Opinion for Application No. PCT/EP2023/075959, dated Jan. 5, 2024, 4 pages, English translation.
Chinese Office Action for Application No. 202380066724.3, dated Sep. 24, 2025, 14 pages with translation.

* cited by examiner

A - A

B-B

C - C

KEY FOR AN ELECTROMECHANICAL LOCKING DEVICE

CROSS-REFERENCE TO RELATED APPLICATIONS

This application is a 35 U.S.C. § 371 National Stage patent application of PCT/EP2023/075959, filed on 20 Sep. 2023, which claims the benefit of European patent application 22196965.2, filed on 21 Sep. 2022, the disclosures of which are incorporated herein by reference in their entirety.

TECHNICAL FIELD

The disclosure relates to a key for an electromechanical locking device. Furthermore, the disclosure shows an assembly method for assembling the key.

BACKGROUND

EP 1 899 924 B1 shows a previously known key for an electromechanical locking device. The previously known key comprises a key bow on which electronics are arranged between two housing shells. A key shank extends from the key bow for insertion into a locking device. There is an electrical contact located on the key shank.

SUMMARY

The present disclosure indicates a key for an electromechanical locking device which has sufficient strength for torque transmission to the locking device, is easy to assemble and/or ensures convenient and safe use.

This is achieved by providing the features of an independent claim. Advantageous further developments of the key are indicated in the dependent device claims, the description and in the figures. Furthermore, the disclosure is also achieved by the features of the method claim according to another independent claim. Advantageous further developments of the method are indicated in the dependent method claims, in the description and in the figures. Features and details described in connection with the key according to the disclosure also apply in connection with the method according to the disclosure and vice versa. In particular, a key is protected which is produced or can be produced by the method according to the disclosure, as well as a method for producing the key according to the disclosure, as indicated in the claims, the description and the figures.

The disclosure shows a key for an electromechanical locking device.

The electromechanical locking device is preferably a lock cylinder, in particular a double or half cylinder, a furniture cylinder or a padlock or a similar device into which the key can be inserted. In particular, the key and the locking device are designed such that a torque can be transmitted to the locking device for moving a driver, in particular a locking lug, by rotating the key. A closure element, in particular a building door or cabinet door, can be unlocked or locked by rotating the driver. In particular, the locking device comprises a corresponding electronic device arranged in the locking device, which selectively locks and releases a rotation of the key in the locking device depending on an electrical signal transmitted by the key. Alternatively, the signal transmitted by the key can be used to enable a mechanical coupling between a cylinder core and the driver. The electronic device preferably comprises a circuit board.

The key has a key bow. Preferably, a key shank extends from this key bow. This key shank is designed for insertion into the locking device and, in particular, for torque transmission to the locking device.

To further define the disclosure, the following imaginary axes and sides are preferably defined:

The key has a longitudinal axis. The longitudinal axis extends in particular along the key shank. Accordingly, the key is inserted into and removed from the locking device along the longitudinal axis. Furthermore, the key has a width axis and a thickness axis. The longitudinal axis, the width axis and the thickness axis are each perpendicular to one another.

Two broad sides are preferably defined on the key. The two broad sides are preferably opposite one another. The two broad sides are each intersected by the thickness axis. An end surface is particularly preferably located on at least one of the two broad sides. The end surface is in particular flat. One end surface is particularly preferably located on each of the two broad sides. One, preferably both, end surfaces are preferably perpendicular to the thickness axis.

Furthermore, the key bow preferably has two opposing narrow sides. The narrow sides are preferably perpendicular to the broad sides. Preferably, each narrow side is intersected by the width axis. The narrow sides are preferably each smaller than the broad sides.

Furthermore, it is preferably provided that the key shank extends along the longitudinal axis starting from a front side of the key bow. A rear side of the key bow is opposite this front side. In the region of the rear side there is preferably a key ring through-opening for attaching the key to a key ring. Preferably, the front side and the rear side are intersected by the longitudinal axis.

Preferably, the key bow comprises an electrical energy storage device and/or electronics. The energy storage device is designed in particular to power the electronics in the key. Additionally or alternatively, the energy storage device can be used to power the locking device as long as the key is inserted into the locking device. The electronics preferably comprise a light device, which will be described in detail later.

Furthermore, it is preferably provided that the electronics comprise a wireless communication module for wirelessly sending and/or receiving signals. This wireless communication module allows the key to communicate with a device. In particular, this is a wireless communication module that is designed for near-field communication, for example via Bluetooth or ultra-wideband.

The device is in particular a mobile device, for example a smartphone, tablet or laptop. In addition, the device can also be a stationary installed device, such as a terminal that is used for door and/or building control.

Furthermore, the electronics are preferably designed to communicate with the locking device. As will be described in detail, the key preferably has at least one transmission element for this purpose. The electronics on the key side are communicatively connected to an electronic device on the locking device side by means of the transmission element, as long as the key is inserted into the locking device.

The transmission element can be used to send electronic data that makes it possible to determine an authorization of a user for unlocking. For example, the transmission element can send an authorization code and/or an authorization time window, which is verified by the electronic device. Alternatively, the electronic device can receive an opening command.

The communication can take place e.g. contact-based.

This makes it possible for the device to communicate with the locking device via the key, provided the key is inserted into the locking device. The communication can take place directly, with the key immediately relaying the information from the sender, i.e. the device or the locking device, to the receiver, i.e. the locking device or the device. Furthermore, indirect, time-delayed communication is possible, in which the key stores the information and relays it with a time delay.

The transmission element serves additionally or alternatively to transmit electrical energy to the locking device. The electrical energy can be used to enable the unlocking to rotate the key or for coupling the driver and/or can be provided for the electronic device.

Furthermore, the key bow comprises a frame according to the disclosure. The energy storage device and/or the electronics is/are located in this frame. The energy storage device and/or the electronics is/are thus received in the frame. For this purpose, a housing is used in particular, which will be described in detail later.

The frame is made in particular of metal or plastic, in particular fibre-reinforced plastic.

The frame preferably extends around the thickness axis or an axis parallel to the thickness axis. The frame is preferably in the form of a closed ring; with ring-shaped not limiting the geometric shape of the frame. In particular, the frame can be designed to be rectangular or oval.

The frame encloses a free space inside the frame-when viewed without electronics, energy storage device and housing. The free space is preferably open on both sides, in particular completely open. The electronics and/or the energy storage device, in particular with the housing, is arranged in this free space. As soon as the housing is mounted in the frame, the free space in the frame is filled by the housing.

Furthermore, it is provided according to the disclosure that the key shank is rigidly connected to the frame. In particular, the frame is composed of a first frame part and a second frame part. The key shank is preferably rigidly arranged on the first frame part.

In particular, this rigid arrangement means that the key shank is immovable relative to the frame. It is therefore preferably provided that the key shank cannot be folded in relative to the frame or removed from the frame. This enables a relatively stable torque transmission from the frame to the key shank and thus to the locking device.

Furthermore, it is provided according to the disclosure that the frame comprises at least one grip region which forms a top surface of the key bow for a user to grasp. This means that the user can directly grasp the frame—not just the housing—and thus transmit the required torque directly to the frame. In particular, the entire grip region has a top surface of the key bow for a user to grasp.

Due to the combination according to the disclosure by the rigid connection of the grip region of the frame with the key shank, the torque transmission from the key to the locking device, in particular a cylinder core of the locking device, can have sufficient strength such that the operation is safe and comfortable for the user.

"Top surface" is thereby understood to mean, in particular, a region of the frame that is exposed and can therefore be touched by the fingers or hand of the user.

In particular, the frame has at least two opposing grip regions, each of which is spaced apart from the longitudinal axis, so that the torque can be transmitted using a corresponding lever. Particularly preferably, the key bow can be gripped such that the key bow is located between two of the fingers of the user and the two fingers thereby each rest on one of the two opposing grip regions.

It is particularly preferably provided that the frame is formed circumferentially on the top surface of the key bow. In this case, the frame is preferably completely circumferential, that is to say in the form of a closed ring, and is located along the entire circumference on the top surface of the key bow.

It is preferably provided that—when viewed along the width axis (i.e. when viewed from the narrow side)—the at least one grip region extends over the entire length of the key bow, which is defined parallel to the longitudinal axis. As a result, the grip region preferably extends from the front side to the rear side of the key bow.

Only the top surface that is spaced apart from the longitudinal axis is preferably regarded as the grip region of the frame, so that torque can be transmitted over the entire grip region. This means that the grip region can be at a distance from the longitudinal axis.

Particularly preferably, the at least one grip region is a section of the frame which itself or its tangent runs parallel or not at 90° to the longitudinal axis.

Particularly preferably, the at least one grip region comprises the furthest point of the key from the longitudinal axis.

Furthermore, it is preferably provided that the at least one grip region does not intersect the longitudinal axis.

As described, it is preferably provided that the frame comprises opposing grip regions. Both grip regions preferably intersect in the same plane perpendicular to the thickness axis.

Furthermore, it is preferably provided that the frame is designed to be substantially rectangular or oval. In the case of the rectangular shape, parallel sides of the rectangular shape are preferably parallel and spaced apart from the longitudinal axis. These two sides form the two opposing grip regions.

Furthermore, it is preferably provided that the frame has a frame thickness of at least 3 mm, in particular at least 5 mm, parallel to the thickness axis. This provides a sufficient area that the user can grasp, in particular grip.

As described, the frame is preferably composed of a first frame part and a second frame part. As a result, the electronics and/or the energy storage device, in particular together with the housing, can be inserted into the frame in an easy-to-assemble manner. The first and second frame parts are separate from each other, at least when the key is assembled.

It is preferably provided that the first and the second frame part are connected in a force-fitting and/or form-fitting and/or materially-bonded manner at at least one connection point. Preferably, the first and second frame parts are connected to each other in a force-fitting and/or form-fitting manner such that the first and the second frame parts are also separate from each other when the key is assembled.

In particular, at least two opposing connection points are provided. Particularly preferably, at least one locking lug, which locks into a corresponding counter locking point, is located at each connection point.

The at least one connection point, preferably the at least two connection points, is/are preferably spaced apart from the longitudinal axis. In particular, there is a connection point in each grip region.

Furthermore, it is preferably provided that the at least one connection point, in particular the two connection points, is/are located in the front half of the key bow facing the key shank.

The key shank preferably comprises a key shank main body. The frame, in particular the first frame part, is preferably connected in one piece to the key shank main body.

The frame, in particular the first frame part, is particularly preferably manufactured monolithically with the key shank main body. This monolithic production means in particular that the frame, in particular the first frame part, and the key shank main body are originally formed together; for example, cast from metal or injection moulded from plastic.

The key shank main body preferably extends over at least half the length of the key shank; particularly preferably over the entire length of the key shank. This ensures that a significant part of the key shank main body can be inserted into the locking device and the torque can be safely transmitted. The length of the key shank is defined coaxially or parallel to the longitudinal axis.

Preferably, the first frame part and the key shank main body are designed to be fork-shaped together. This describes in particular that the first frame part comprises a front section from which two parallel front legs extend. The front section is preferably perpendicular to the longitudinal axis by itself or with a tangent. The two front legs are in particular spaced apart from the longitudinal axis. In particular, the two front legs each form part of the two opposing grip regions. The key shank main body preferably extends centrally between the two front legs from the front section of the first frame part. The key shank main body thereby extends in one direction and the two front legs in the opposite direction.

As already mentioned, the key bow can comprise a housing. The housing preferably comprises a first housing part and a second housing part.

The housing can be made of plastic.

Preferably the housing is surrounded by the frame. The housing is therefore arranged in the frame. In particular, the housing is received in the frame and thus fastened in the frame. Particularly preferably, the frame encloses the housing over its entire circumference—with the exception of any key ring through-opening that can be formed between the housing and the frame.

The housing receives the electronics and/or the energy storage device. In particular, the housing tightly encloses the electronics and/or the energy storage device. The receiving space for the electronics and/or the energy storage device is formed in particular between the first and second housing parts.

The housing preferably forms a top surface of the key bow on each of the two opposing broad sides—that is, a surface that can be touched by the user.

It is preferably provided that the housing protrudes beyond the frame along the thickness axis at least on one side, preferably on both sides.

It is preferably provided that the frame protrudes beyond the housing along the longitudinal axis and/or along the width axis.

The frame, in particular each frame part, preferably comprises at least one rail. The respective rail is designed in particular to arrange the first housing part and the second housing part on one another.

In particular, at least two rails are located in the frame. The rails can be arranged parallel to each other.

Each housing part can have an associated rail holder. By pushing the frame-side rails and the housing-side rail holders into one another, the two housing parts can be arranged and fixed relative to one another and relative to the frame.

The rail holder can be designed as a groove and the rail as a complementary projection that fits into the groove (also: protrusion). In the same way, in the reverse version, the rail can be designed as a groove and the rail holder can be designed as a complementary projection that fits into the groove (also: protrusion).

A seal is particularly preferably arranged between the two housing parts. In particular, the at least one rail or the rails in the frame are designed so as to press the two housing parts towards one another and thereby compress the seal.

Furthermore, it is preferably provided that the first housing part at least partially forms a top surface of the key bow on the first broad side and the second housing part on the opposing second broad side.

It is preferably provided that the key shank has at least the transmission element for the transmission of electrical energy (also: power) and/or electronic data to the locking device. This at least one transmission element is, for example, a metal sheet, a wire or a printed circuit board.

Particularly preferably, at least two of the transmission elements are provided, with the transmission elements being arranged symmetrically so that the key can be used like a reversible key. In addition, the geometry of the key shank is preferably chosen so that the key can be used as a reversible key. In particular, for the reversible key-like usability, it is provided that the key shank is designed symmetrically in relation to a plane in which the longitudinal axis lies.

The at least one transmission element preferably extends from the electronics into the key shank.

Inside the key bow, the transmission element preferably has a circuit board contact surface. At this circuit board contact surface, the transmission element can be connected to a circuit board of the electronics in an electrically conductive manner.

In the region of the key shank, the transmission element preferably has a locking device contact surface which is exposed and—when the key is inserted into the locking device—can be connected to the electronic device on the locking device side in an electrically conductive manner.

The key shank preferably comprises an insert element. This insert element is preferably made of plastic.

The insert element is preferably arranged on at least one of the two housing parts, preferably on both housing parts. For example, one of the two housing parts has a receiving groove into which the insert part can be inserted. This receiving groove is covered by the other housing part, so that the insert element is arranged, in particular clamped, between the two housing parts.

It is preferably provided that the insert element is fastened to the key shank main body, in particular in a force-fitting and/or form-fitting manner. A tongue-and-groove connection is particularly preferably provided between the insert element and the key shank main body.

The key shank main body particularly preferably has parallel shank legs that are spaced apart from one another. The insert element can be inserted between the shank legs. In particular, the insert element is connected to at least one of the shank legs via the tongue-and-groove connection. At the front end of the key shank, the shank legs can be connected to one another via a shank leg connection. The insert element does not thereby have to extend to the front end of the key shank main body.

In the frame, in particular in the front section of the first frame part, there is preferably an insert element through-opening through which the insert element can be inserted into the key shank from the inside of the frame to the outside.

The insert element preferably comprises the at least one transmission element. In particular, the at least one transmission element is embedded in the insert element.

The key preferably comprises a socket, in particular designed as a USB-C connection. The socket is designed to charge the energy storage device and/or to connect the cable to the electronics. The electronics preferably comprise a circuit board on which the socket is arranged.

The frame, in particular the second frame part, preferably has a frame socket opening. The socket for a corresponding plug is accessible through this frame socket opening.

The socket itself need not extend into the frame socket opening. Rather, it is preferably provided that the socket does not extend into the frame socket opening, but is merely arranged in the housing.

One of the two housing parts preferably has an enclosing housing socket opening for the socket. This enclosing housing socket opening is preferably closed over its entire circumference, so that the socket is surrounded over its entire circumference by only one of the two housing parts. As a result, the sealing of the two housing parts or the sealing towards the socket is designed to be simple.

As mentioned, the key can comprise a key ring through-opening for attaching the key to a key ring, in particular for receiving a key ring. This key ring through-opening is located in particular between the frame and the housing, preferably on the rear side of the key bow.

Preferably, the rear side and/or the region of the frame that abuts the key ring through-opening separates the grip regions from each other. The rear side and/or the region of the frame that abuts the key ring through-opening are preferably defined outside the grip region.

It is preferably provided that the key has a button on or in the key bow. Particularly preferably, the key bow only comprises a single button. The button is preferably located on the circuit board and therefore inside the housing described. In particular, only a single button is provided, so that the user does not have the choice between a plurality of buttons, but can only press this one button.

To actuate the button, the housing preferably has an actuating section. This actuating section can be pressed by the user. In particular, the user thereby presses the actuating section on one broad side and supports the key bow with an opposite finger or hand on the opposing broad side.

In addition to the actuating section, the housing preferably comprises a support section. In particular, any region of the housing that is not an actuating section—i.e. cannot be flexibly pressed against the button by the user—is the "support section" of the housing.

Furthermore, it is preferably provided that the button can be actuated by pressing the first and second housing parts against one another. In particular, the two opposing broad sides of the key bow are thereby pressed against one another.

It is preferably provided that the actuating section and the support section are formed in one piece with one another. Particularly preferably, this is a monolithic design of the actuating section and support section, preferably as an injection moulded part, particularly preferably as a one-component injection moulded part. Particularly preferably, the first housing part comprises the actuating section, which is surrounded by the support section. For this purpose, the first housing part is designed in particular to be monolithic.

As already described, the housing preferably forms an end surface, in particular a flat end surface, of the key bow on at least one broad side. The actuating section preferably lies in this end surface. A part of the end surface can also be formed by the support section. The end surface is preferably surrounded, in particular surrounded over its entire circumference, by an edge section of the first housing part. This edge section has in particular the rail holder described, which represents the connection to the frame.

It is preferably provided that the actuating section comprises at least 20%, preferably at least 25%, particularly preferably at least 30% of the extension of the broad side. This is the broad side on which the actuating section is arranged, i.e. the broad side that can be pushed in to press the button.

Additionally or alternatively, it is preferably provided that the actuating section comprises at least 30%, preferably at least 40%, particularly preferably at least 50%, of the extension of the end surface described.

"Extension" is to be understood in particular as the projected area perpendicular to the thickness axis, with either the area of the entire key bow or the area of the end surface being decisive here.

It is preferably provided that the actuating section merges into the support section within the end surface described.

Particularly preferably, the actuating section and the support section, in particular in the region of the end surface, differ at least partially in an internal wall thickness of the housing. The transition from one wall thickness to another wall thickness can occur abruptly at a step, or the wall thickness can change continuously or in a plurality of steps.

The transition from one wall thickness to the other wall thickness does not necessarily have to be at the transition from the actuating section to the support section. It is important that the changing wall thickness enables a correspondingly flexible design of the housing, so that the actuating section can be easily pressed inwards in the direction of the button.

In particular, the change in wall thickness is "internal", so that the outer top surface of the key bow has a flat end surface and the difference in wall thickness is not visible.

Furthermore, it is preferably provided that the, in particular one-piece, support section forms the housing on the narrow side of the key bow. Thus, if the key is viewed along the longitudinal axis or along the width axis (i.e. when viewing the front, back or narrow side), in particular the frame section and thus at least a part of the support section of the housing can be seen—partially hidden by the surrounding frame.

The housing preferably has a support column to limit a travel when the actuating section is actuated. This support column prevents the actuating section from being pressed too hard on the button. The support column is formed in particular by a first support column part and a separately formed second support column part. These two support column parts meet when the actuating section is pressed.

In particular, the first support column part is located on the first housing part and the second support column part is located on the second housing part.

Preferably, the actuating section is formed in one piece, in particular monolithically, with one of the support column parts.

The circuit board preferably has a column recess. This can be a hole or a groove. The support column, for example at least one of the two support column parts, protrudes through this column recess. As a result, the support column can be arranged relatively close to the button to be protected.

In particular, it is provided that the electronics of the key are designed so that communication with the device, e.g. smartphone, begins when the button is actuated. In particular, the electronics send out a corresponding signal via the wireless communication module after the button is actuated in order to establish communication with the device.

Furthermore, it is preferably provided that the electronics are designed so that inserting and/or removing the key shank into/out of the locking device causes the electronics to act, for example to wake up the electronics and/or to establish communication with the device.

Furthermore, it is preferably provided that the key bow of the key comprises a light device.

Preferably, the electronics are designed to actuate the light device to reproduce at least one item of information in a luminous manner. This information can be a state of the key, for example. Furthermore, the information can relate to the locking device, if the key is inserted into the locking device. In addition, the information can, for example, relate to the wireless communication connection between the key and the device, e.g. smartphone.

The light device in the key bow is designed in particular to light up in at least two colours. The light device particularly preferably comprises at least one light element. This light element is preferably an individual LED. The individual light element is in particular designed to emit at least two, preferably at least three, particularly preferably at least four, colours. For example, the light element is an RGB LED. This LED can basically light up in red, green or blue and mix the colours so that white light can also be generated, for example.

It is preferably provided that the electronics are designed, by actuating the light device, to represent different information using different patterns.

The respective "pattern" is characterised by the colour and/or the flashing pattern and/or the light intensity. Two different patterns therefore differ in colour and/or flashing pattern and/or in light intensity.

It is preferably provided that the electronics are designed, by actuating the light device, to represent different information via the key using different patterns.

Furthermore, it is preferably provided that the electronics are designed, by actuating the light device, to represent different information via the locking device using different patterns.

As described, the key is designed for a wireless communication connection with the device, in particular by way of the wireless communication module of the electronics. The electronics are preferably designed, by actuating the light device, to display a search for a communication connection and/or an existing communication connection by way of the light device, in particular the light element. This "search for a communication connection" or the "existence of a communication connection" thereby forms the "information" that is displayed via the light device.

As described, the key can comprise an electrical energy storage device. The electronics are preferably designed, by actuating the light device, in particular by way of the lighting element, to represent a charge status of the energy storage device as information.

The key preferably has an interface, for example the socket described, for charging the energy storage device. The electronics are preferably designed, by actuating the light device, to represent as information a charging process and/or an end of the charging process by way of the light device, in particular the light element. Particularly preferably, it is provided that the representation is limited to the time in which the interface is in connection with an energy source.

Furthermore, it is preferably provided that the electronics are designed, by actuating the light device, to represent as information at least one of the following errors by way of the light device, in particular the light element:

The error can be a faulty locking device. For example, the key can output a corresponding signal via the light device, which prompts the user to read on the device (e.g. smartphone) what the specific error is.

In a similar way, a faulty key and/or disrupted communication with the device, can be displayed.

Furthermore, it is preferably provided that the electronics are designed to actuate the light device, in particular the light element, after a trigger event, to reproduce the at least one item of information in a luminous manner. The trigger event can thereby be at least one of the following events: pressing the described button of the key; and/or inserting the key into the locking device; and/or removing the key from the locking device; and/or connecting the interface to the energy source.

Furthermore, it is preferably provided that the electronics are designed, by actuating the light device, to represent different patterns—that is, different colours and/or different flashing patterns and/or different light intensities—triggered one after the other by a, in particular single, trigger event. In particular, different information about the key and/or the locking device can be thereby represented by the different patterns.

Furthermore, it is preferably provided that the electronics are designed to actuate the light device to represent a charge status of the energy storage device after the key has been inserted into the locking device, with in particular the representation of the charge status being information from a plurality of items of information that is represented after inserting the key.

Furthermore, it is preferably provided that the key can be configured in such manner that at least a part of the information that can be represented by the light device is not, in particular permanently, represented by the light device, with the configuration being able to be stored in the electronics. This makes it possible for example that certain information or its representation is deactivated for certain users or certain application purposes in order to save energy and not to overwhelm the user.

It is preferably provided that the housing of the key comprises at least one light guide. Such a light guide consists, for example, of appropriate plastic or glass and directs the light, for example from the LED on the circuit board, to the outside so that it is visible to the user.

It is preferably provided that the light device, preferably the light element, lights up through the light guide towards the broad side of the key.

Furthermore, it is preferably provided that the light device, preferably the light element, lights up through the light guide beyond the frame in the direction of the key shank.

It can be provided that the at least one light guide protrudes beyond the frame when viewed perpendicular to the thickness axis.

If a plurality of light guides are present, one of the light guides can protrude beyond the frame on opposing sides of the key bow when viewed perpendicular to the thickness axis.

Furthermore, it is preferably provided that the light device, in particular the light element, is arranged within the free space described, which is enclosed by the frame; in particular, the light device is located on the circuit board of the key.

The light guide is preferably located at least partially in the actuating section described, which is designed to be flexible in such manner that it can be pushed in to actuate the button of the key.

The light guide described above is particularly preferably a first light guide and a second light guide is also provided. The two light guides can also be combined in one component, so that it is ultimately a first light guide section and a second light guide section. The first light guide is arranged for emission on the first broad side of the housing. The second light guide is arranged for emission on the second broad side of the housing.

In particular, it is provided that light can be emitted, in particular synchronously, from the light device through the first and second light guides. For this purpose, the light device can have a light element that feeds into both light guides. Alternatively, the light device can have two synchronously actuated light elements (for example two LEDs), with one light element feeding into each one of the two light guides.

Furthermore, it is preferably provided that the electronics are designed to actuate the light device in order to represent contrasting information about mutually exclusive states using different patterns, with the patterns differing in particular in the flashing pattern and/or in the colour. Such mutually exclusive states are, for example, “Communication connection active” and “Communication connection not active”.

In particular, it is thereby provided that the patterns for the two contrasting items of information differ both in the flashing pattern and in the colour. This means that colour-blind people can only recognise these two mutually exclusive states on the basis of the flashing pattern.

Furthermore, it is preferably provided that the light intensity of the light device can be varied by the electronics depending on the time of day and/or the ambient lighting.

The disclosure also comprises an arrangement. The arrangement comprises the key described and the electromechanical locking device described. The locking device is preferably designed to be arranged on a building door.

The key is designed in particular to be able to be inserted into the locking device with its key shank and to transmit a torque to the locking device. Furthermore, it is thereby preferably provided that the at least one transmission element is designed to transmit power and/or data to the locking device.

Furthermore, the arrangement can comprise the device described, with the wireless communication module of the electronics of the key being designed to exchange data with the device.

The disclosure further comprises an assembly method which is used in the manufacture of a key, in particular the key described above. The assembly comprises at least the following steps:

a) Firstly, the electronics and/or the electronic energy storage device of the key is/are surrounded by the housing. In particular, the electronics and/or the energy storage device is/are arranged between the first housing part and the second housing part.

b) The housing, in particular the closed housing, is then fastened to the frame. As already described, the frame has at least one grip region which forms a top surface of the key bow for a user to grasp.

In step b), the housing is preferably arranged, in particular pushed in, on the first frame part. Furthermore, the housing is arranged, in particular pushed in, on the second frame part. In particular, the two frame parts are also fastened to each other.

It is particularly preferably provided that when the housing is fastened to the frame, in particular to the first frame part, the insert element of the key shank is already located on the housing and is inserted into the key shank main body.

BRIEF DESCRIPTION OF THE DRAWINGS

The disclosure will now be explained further on the basis of an exemplary embodiment, in which the following is shown.

DETAILED DESCRIPTION OF THE DRAWINGS

The design of a key 1 according to an exemplary embodiment is explained in detail below on the basis of FIGS. 1 to 10. Unless otherwise stated, reference is thereby always made to all figures.

Figure 1:
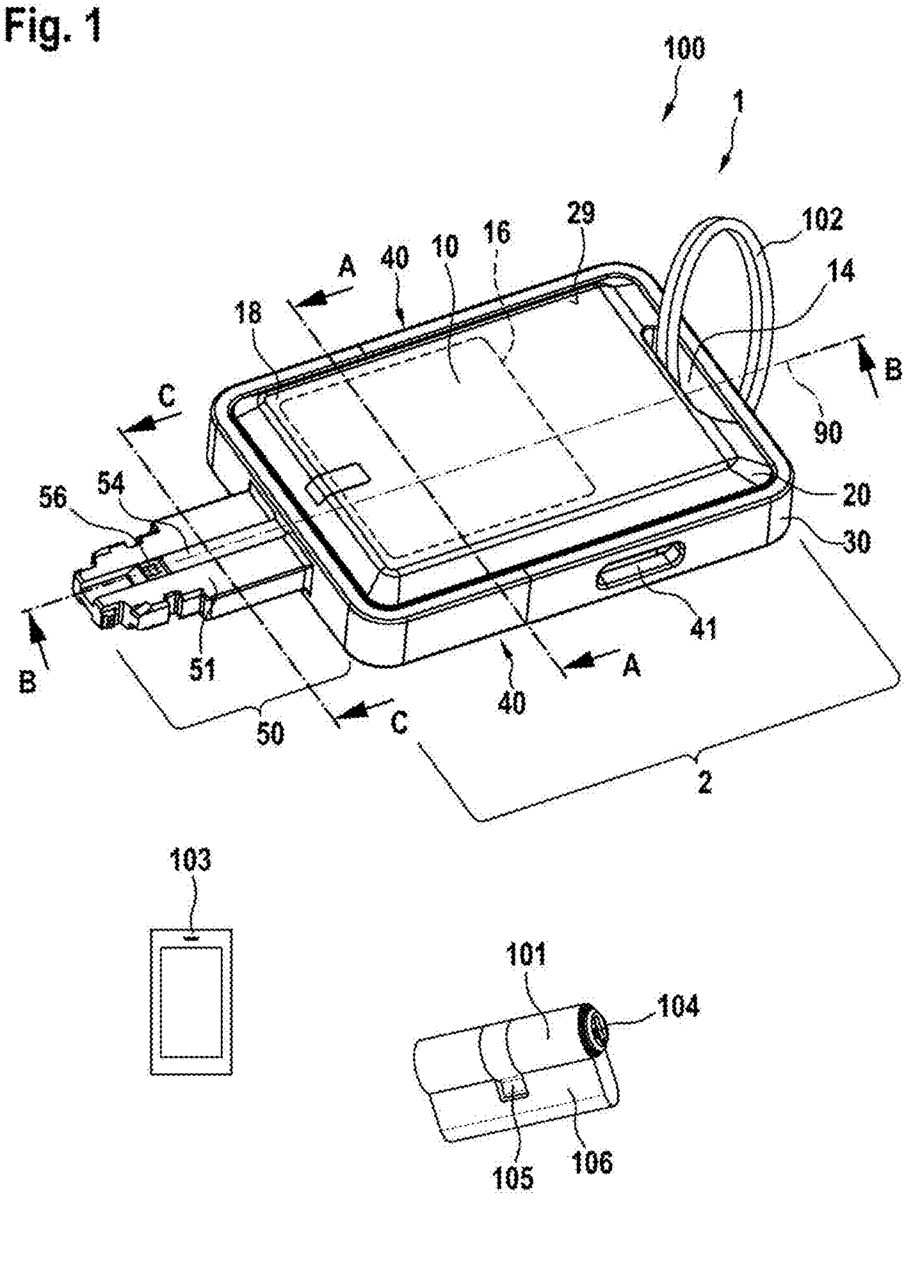
FIG. 1 a schematic view of an arrangement according to the disclosure with a locking device, device and key according to the disclosure in accordance with an exemplary embodiment, FIG. 2 an exploded representation of the key according to the disclosure in accordance with the exemplary embodiment, FIG. 3 a view of a narrow side of the key according to the disclosure in accordance with the exemplary embodiment, FIG. 4 a view of a broad side of the key according to the disclosure in accordance with the exemplary embodiment, FIG. 5 the section A-A marked in FIG. 1, FIG. 6 the section B-B marked in FIG. 1, FIG. 7 the section C-C marked in FIG. 1, FIG. 8 a detail of the key according to the disclosure in accordance with the exemplary embodiment, FIG. 9 electronics and a light device of the key according to the disclosure in accordance with the exemplary embodiment, FIG. 10 a state during the assembly of the key according to the disclosure in accordance with the exemplary embodiment, FIG. 11 an assembly method according to the disclosure, and FIG. 12 different light patterns for the key according to the disclosure in accordance with the exemplary embodiment.

FIG. 1 shows the key 1 according to the disclosure in an isometric view together with a locking device 101 and a device 103. The key 1 with the locking device 101 forms an arrangement 100 according to the disclosure. The device 103 can also be part of this arrangement 100. In addition, a key ring 102 can be arranged on the key 1.

The locking device 101 is a lock cylinder with a corresponding electronic device, as explained in the general part of the description. The device 103 is a mobile device or a stationary terminal, also as defined in the general part of the description.

The key 1 comprises a key bow 2 and a key shank 50. The key shank 50 is used to insert into the locking device 101. If there is an electronic access authorisation, the key 1 can rotate a cylinder core 104. If, on the other hand, there is no electronic access authorisation, the cylinder core 104 cannot be rotated in a locking device housing 106. Here, a locking element, not represented, of the locking device 101 is prevented from leaving a connecting position between the cylinder core 104 and the locking device housing 106 by an electromechanical actuator, not represented, of the locking device 101. This means that the key 1 cannot be rotated in the locking device 101. Thus, a rotation of the key 1 in the locking device 101 is locked.

If there is an electronic access authorisation, a driver 105, which is designed as a locking lug, can be rotated with the cylinder core 104. For this purpose, the electromechanical actuator has been operated, which enables the locking element to be withdrawn from the connecting position. A building door can be unlocked via the driver 105.

The key bow 2 is formed by a housing 10 and a frame 30. The frame 30 forms a free space 44 open on both sides (see FIG. 10) for arranging the housing 10. As soon as the housing 10 is mounted in the frame, the free space 44 in the frame 30 is filled by the housing 10. The housing 10 is surrounded by the frame 30 in a top view.

In the key bow 2, inside the housing 10 and thus surrounded by the frame 30, there is located electronics 70 of the key 1. The electronics 70 have the circuit board 71, which is represented in detail in FIG. 9.

Figure 9:
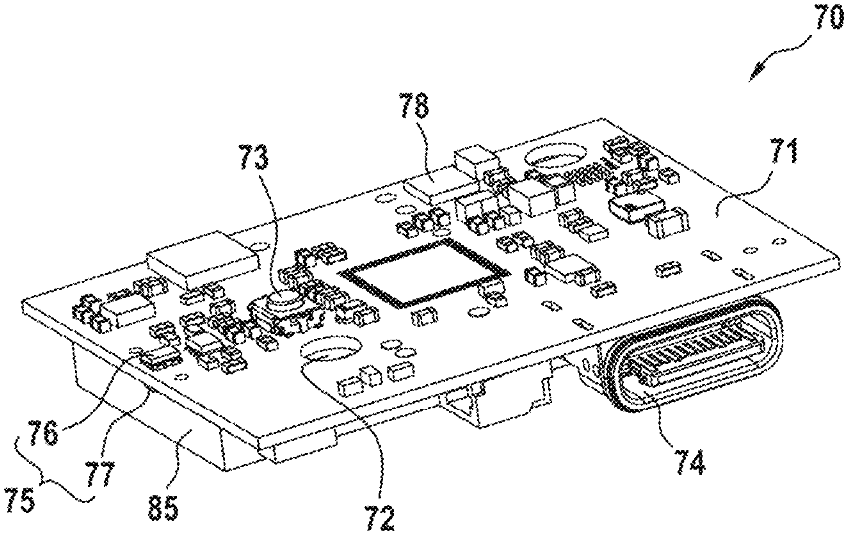

Furthermore, FIG. 9 illustrates that an energy storage device 85 for powering the electronics 70 and/or the locking device 101, in particular an electronic device and/or the actuator of the locking device 101, is arranged inside the key bow 2. This energy storage device 85 can be charged via a socket 74. The housing 10 surrounds the energy storage device 85. It is also conceivable to transmit data via socket 74. A cable connection to the electronics 70 can be established via the socket 74.

The frame 30 of the key bow 2 is formed by a first frame part 31 and a second frame part 32.

The first frame part 31 has a front section 33. The key shank 50, in particular a key shank main body 51, is located on this front section 33. This key shank main body 51 is formed monolithically together with the first frame part 31, for example cast together from metal. This implements the rigid connection according to the disclosure between the frame 30 and the key shank 50.

Figure 3:
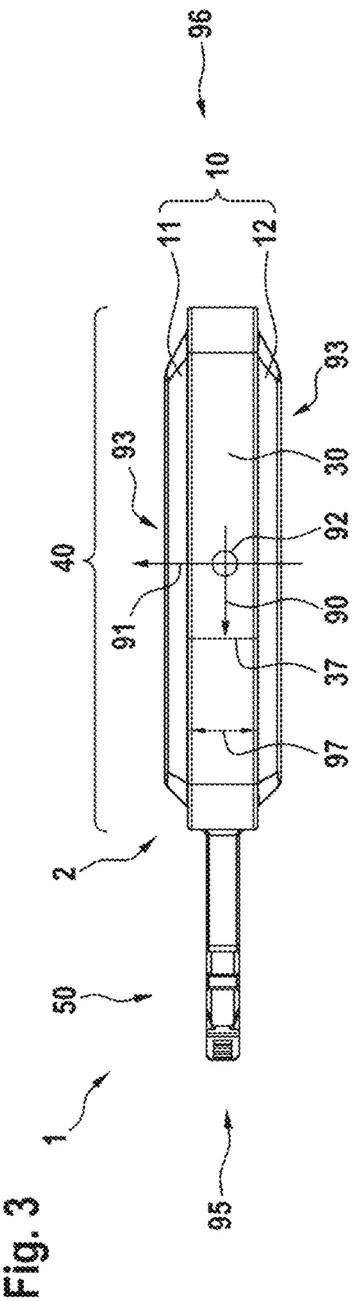
Figure 4:
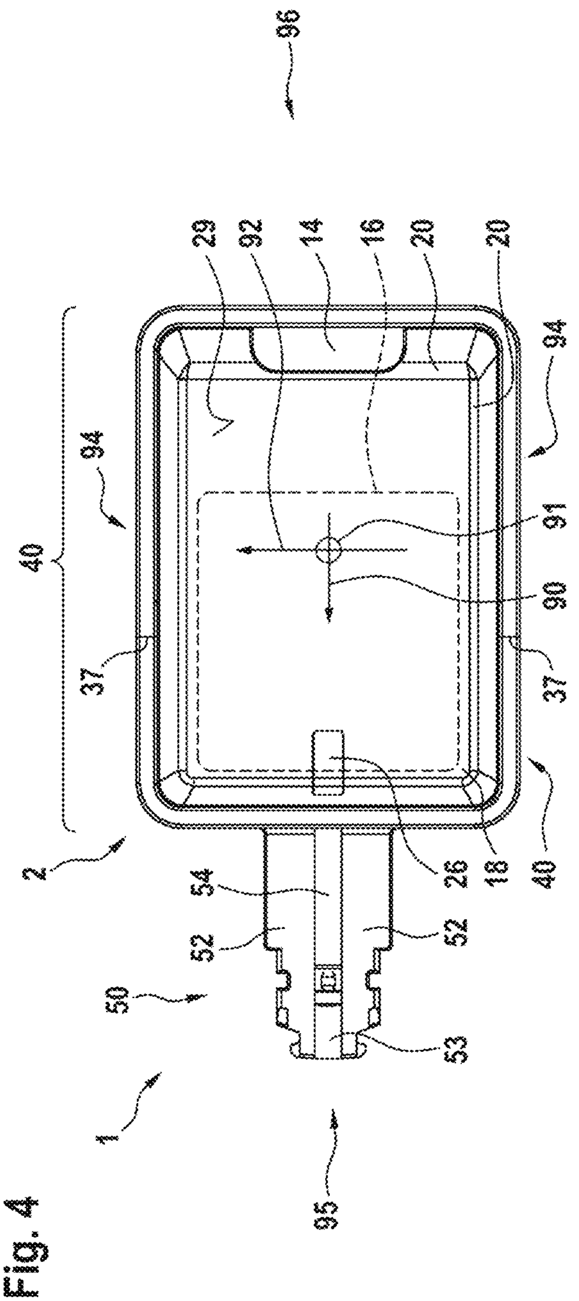

To define the disclosure, axes and sides are used, which are in particular illustrated in FIGS. 3 and 4. Accordingly, the key shank 50 extends along a longitudinal axis 90. A thickness axis 91 and a width axis 92 are perpendicular to the longitudinal axis 90. The key bow 2 has two opposing broad sides 93. These two broad sides 93 are intersected by the thickness axis 91. Furthermore, the key bow 2 has two opposing narrow sides 94. The narrow sides 94 are intersected by the width axis 92.

The key shank 50 is located on a front side 95 of the key bow 2. A rear side 96 is opposite this front side 95. A key ring through-opening 14 for the key ring 102 can be located on this rear side 96. The front side 95 and the rear side 96 are intersected by the longitudinal axis 90. Both the frame 30 and the housing 10 adjoin the key ring through-opening 14 here.

A frame thickness 97 of the frame 30 is defined parallel to the thickness axis 91. In the exemplary embodiment shown, the frame 30 constantly has this frame thickness 97 at every point. This frame thickness is preferably at least 3 mm such that sufficient stability is guaranteed.

Furthermore, the representation in FIG. 3 shows that the housing 10 projects beyond the frame 30 on both sides, i.e. on both broad sides 93, when viewed along the longitudinal axis 90 or the width axis 92.

The top view in FIG. 4 shows a view along the thickness axis 91. It can be seen that the frame 30 protrudes beyond the housing 10 along the longitudinal axis 90 and along the width axis 92—i.e. over its entire circumference. The frame 30 is thus formed circumferentially on the top surface of the key bow 2. In this case, the frame 30 is designed to be open in the direction of the thickness axis 91. The broad sides 93 of the key bow 2, more precisely, the top surfaces of the broad sides 93, are thus formed by the housing 10 and the frame 30.

The housing 10 forms a top surface of the key bow 2 on opposing broad sides 93 intersected by the thickness axis 91.

The housing 10 is composed of a first housing part 11 and a second housing part 12. Each housing part 11, 12 has a rail holder 13 in each case. Corresponding rails 43 of the frame 30 are inserted into this rail holder 13 in order to arrange the two housing parts 11, 12 together and to seal the housing 10 tightly.

Figure 2:
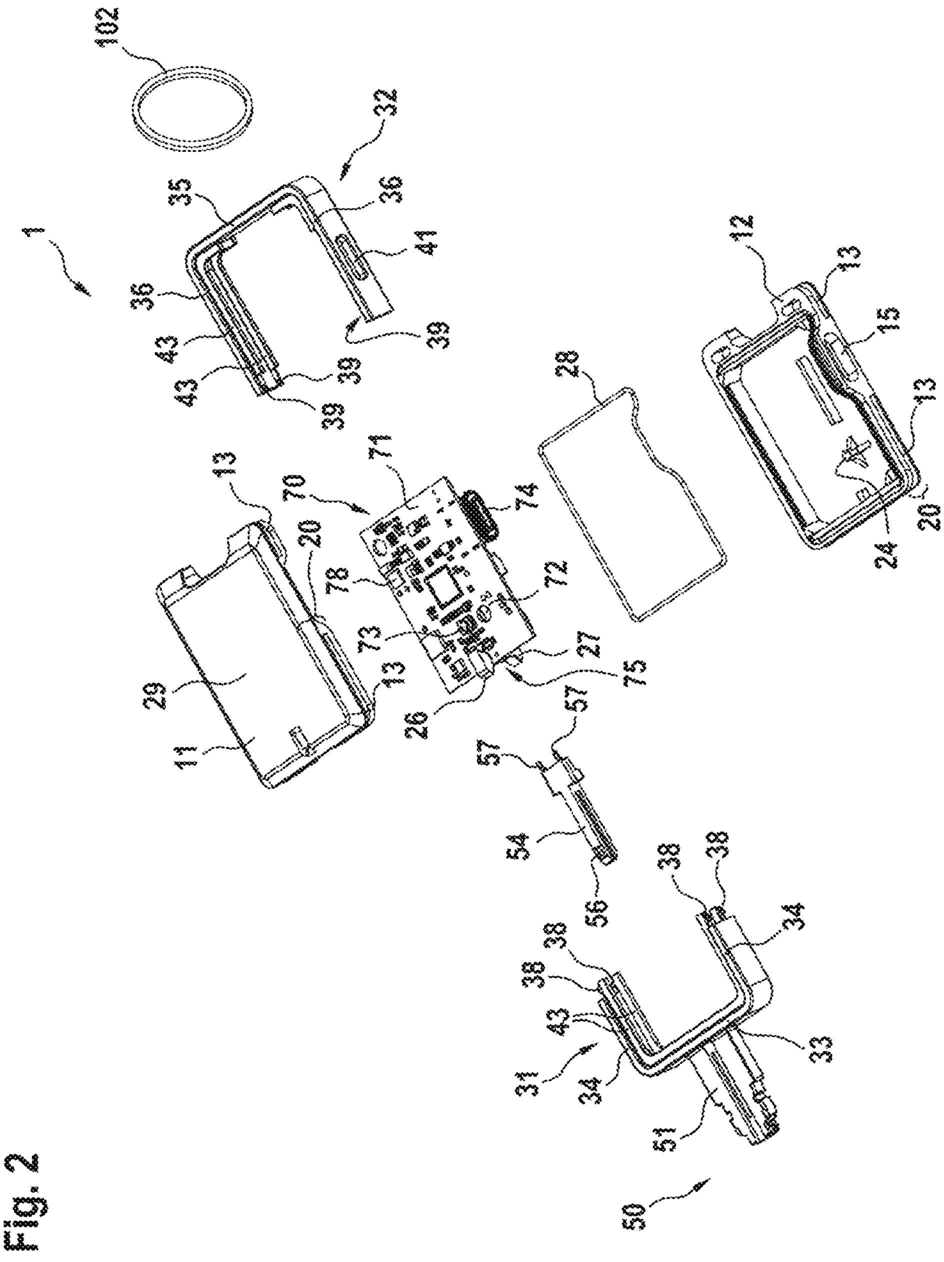

The exploded representation in FIG. 2 shows that a seal 28 can be inserted between the two housing parts 11, 12. Alternatively, this seal 28 can also be part of one of the two housing parts 11, 12, for example by way of a two-component injection moulding process.

Front legs 34 of the first frame part 31 extend from the front section 33 in the direction of the rear side 96. As a result, the first frame part 31 is formed in the shape of a fork together with the key shank main body 51.

The second frame part 32 is designed to be U-shaped and thereby comprises a rear section 35 parallel to the front section 33. Parallel rear legs 36 extend from this rear section 35 in the direction of the front side 95.

Two frame parts 31, 32 are connected to one another via two connection points 37. Each connection point 37 has locking lugs 38 and associated counter locking points 39. Through these connection points 37, the two frame parts 31, 32 are connected to one another in a form-fitting manner. The connection points are spaced from the longitudinal axis 90.

The frame 30, in the exemplary embodiment shown the second frame part 32, has a frame socket opening 41 through which the socket 74 is accessible.

In the housing 10, in particular in the second housing part 12, there is located a housing socket opening 15 for the socket 74.

The frame 30 has a grip region 40 on each of the two narrow sides 94. The two grip regions 40 each form a top surface of the key bow 2, which can be gripped by the user in order to rotate the key 1 in the locking device 101. The torque can be transmitted directly to the key shank 50 through the grip regions 40, which are located directly on the frame 30. There are no undesirable strains on the housing 10.

According to the disclosure, the grip region 40 is thus rigidly connected to the key shank 50. This enables very good torque transmission from the user to the locking device 101, in particular to the cylinder core 104 and the driver 106.

In the exemplary embodiment shown, the two grip regions 40 extend parallel and spaced apart from the longitudinal axis 90. In particular, the two grip regions 40 are formed by the two front legs 34 and the two rear legs 36. The grip regions 40 are separated from each other by the rear section 35 and the front section 33.

The two grip regions 40 extend over the entire length of the key bow 2.

Figure 5:
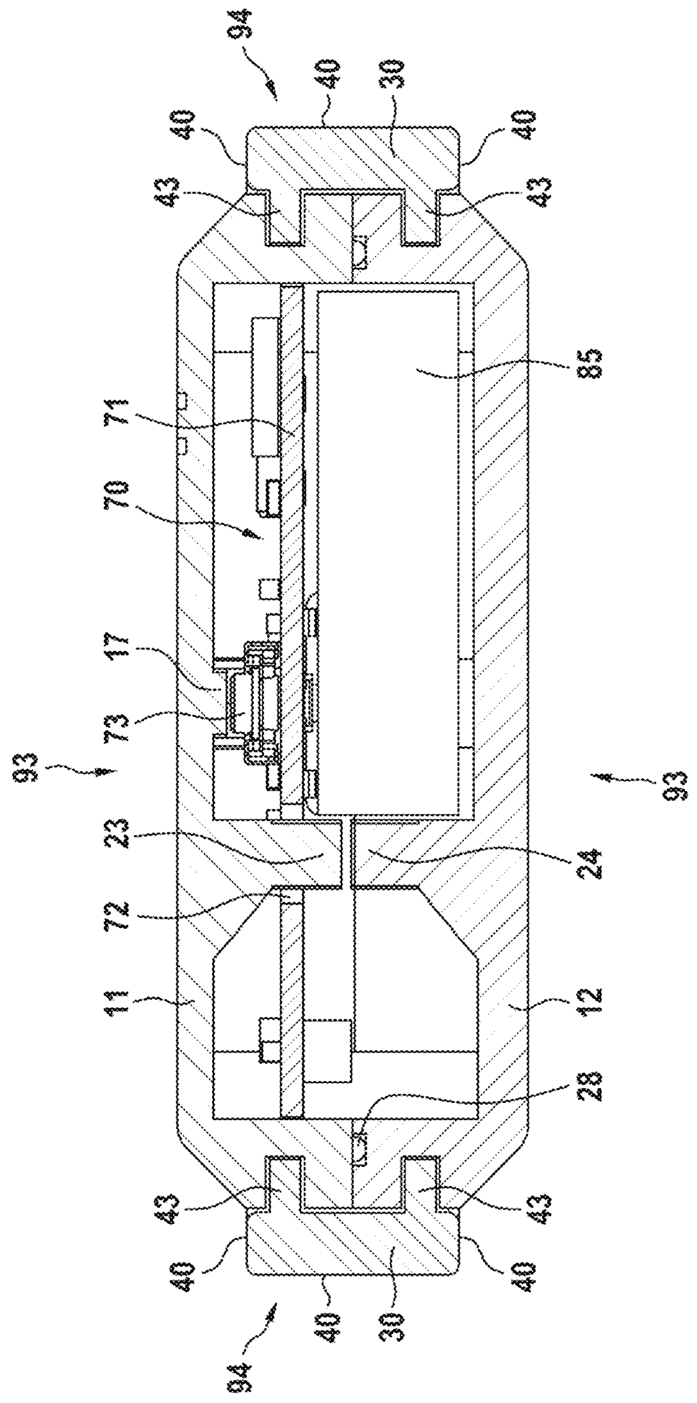

For example, the section A-A in FIG. 5 shows a button projection 17 on the inside of the first housing part 11. This button projection 17 can be pressed on an associated button 73. For this purpose, the user presses the two housing parts 11, 12 against each other.

The key bow 2 has a relatively large actuating section 16, which is designed to be flexible in such manner that it can be pushed in by the user to actuate the button 73. The user does not thereby have to look for a specific, small place on the key bow 2 in order to actuate the button 73, but can press on the relatively large actuating section 16.

For example, the views in FIG. 1 and FIG. 4 illustrate that a relatively large area of the first housing part 11 is designed as an actuating section 16. This actuating section 16 is surrounded all around by a support section 18. Any region of the first housing part 11 that does not form the actuating section 16 is assigned to this support section 18.

In particular, the first housing part 11 has a flat end surface 29 on one of the two broad sides 93. This flat end surface 29 is largely formed by the actuating section 16. At least a rear part of the flat end surface 29 is designed as a support section 18. In addition, the first housing part 11 comprises an edge section 20 which extends all around the flat end surface 29. This edge section 20 is also part of the support section 18.

Figure 6:
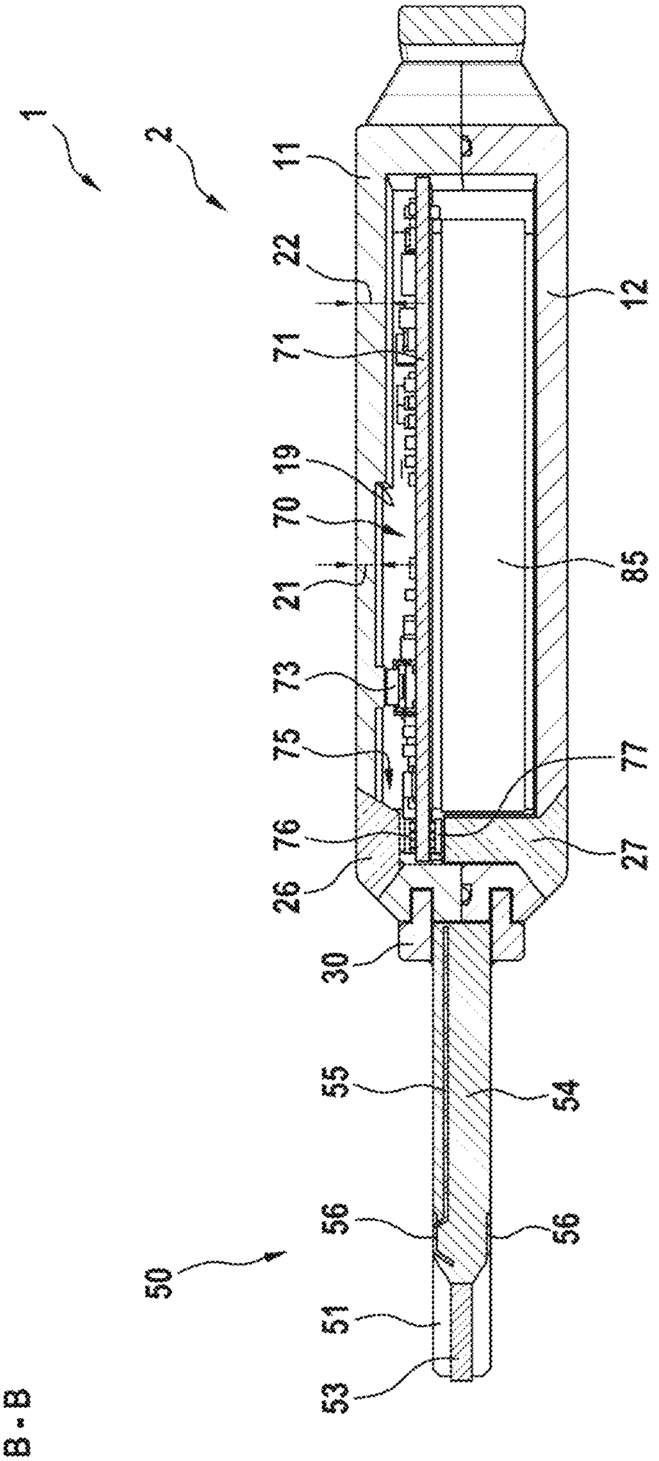

In order to achieve a correspondingly flexible design of the actuating section 16, the flat end surface 29 can have different wall thicknesses. In particular, the representation in FIG. 6 shows that in the region of the end surface 29, a first thin wall thickness 21 and a second thicker wall thickness 22 are provided. In the exemplary embodiment shown, the two wall thicknesses 21, 22 merge into one another with a step 19. Alternatively, a plurality of steps or a continuous change in the wall thickness can also be provided here.

In order that the two housing parts 11, 12 cannot be pressed too far or too hard against one another when actuating the button 73, a support column is provided, which is formed from a first support column part 23 and the inside of the first housing part 11 and a second support column part 24 on the inside of the second housing part 12. When the actuating section 16 is pushed in, the two support column parts 23, 24 meet to form the support column.

Figure 8:
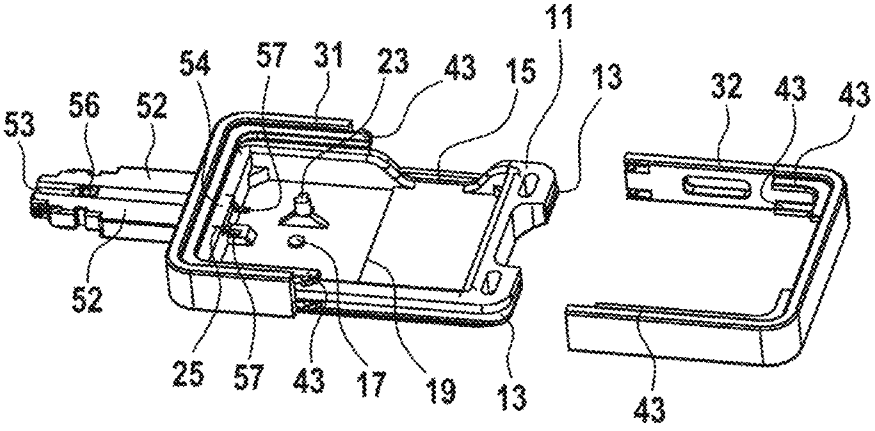

For example, FIG. 8 shows that the first housing part 11 has a receiving groove 25 for inserting an insert element 54. This makes it possible to arrange the insert element 54 on the housing 10.

Furthermore, the housing 10 comprises a first light guide 26 on one broad side 93 and a second light guide 27 on the opposing broad side 93. The two light guides 26, 27 are each arranged to emit light on the associated broad side 93 and beyond the frame 30 in the direction of the key shank 50. For this purpose, the light guides 26, 27 protrude beyond the frame 30.

As already described, the key shank 50 comprises the key shank main body 51, which is a monolithic component of the first frame part 31. This key shank main body 51 has two shank legs 52 spaced apart from one another and a shank leg connection 53. The shank leg connection 53 connects the two shank legs 52 to one another at the front end of the key 1.

Figure 7:
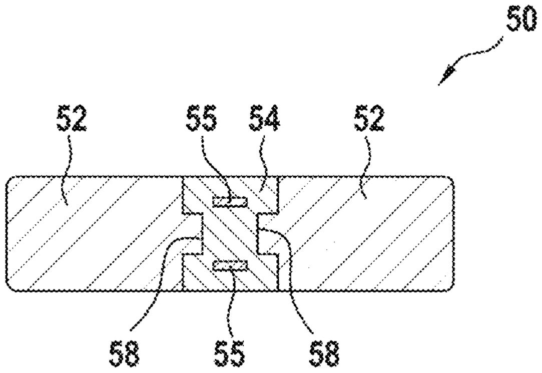

Furthermore, the key shank 50 comprises the insert element 54, in particular made of plastic. This insert element 54 is inserted between the two shank legs 52. In particular, the sectional representation C-C in FIG. 7 illustrates that the insert element 54 is located between the two shank legs 52 and is connected to both shank legs 52 via a tongue-and-groove connection 58.

Transmission elements 55 extend inside the insert element 54. Since the key 1 is designed as a reversible key, two of these transmission elements 55 are provided. For this purpose, the transmission elements 55 are arranged symmetrically in the key shank 50.

In the region of the key shank 50, the two transmission elements 55 each have a locking device contact surface 56. The respective locking device contact surface 56 is exposed on the top surface of the key shank 50 and can therefore be used for data and/or energy transmission to the locking device 101.

Inside the key bow 2, the transmission elements 55 each have a circuit board contact surface 57 in order to connect the two transmission elements 55 to a circuit board 71 in an electrically conductive manner.

On the circuit board 71 there is located the button 73 already described, which can be pressed by the actuating section 16, in particular via the button projection 17.

Furthermore, the socket 74 is located on the circuit board 71, here designed as a USB-C socket.

A column recess 72 is located relatively close to the button 73, here as a hole. The support column, formed by the two support column parts 23, 24, protrudes through this column recess 72.

On the circuit board 71 there is located a wireless communication module 78, designed for near-field communication with the device 103.

Furthermore, FIG. 9 illustrates that a light device 75 is arranged on the circuit board 71. In the exemplary embodiment shown, this light device 75 comprises a first light element 76 in the form of an LED on one side of the circuit board 71 and a second light element 77 in the form of an LED on the opposing side of the circuit board 71. The first light element 76 is arranged to feed light into the first light guide 26. The second light element 77 is arranged to feed light into the second light guide 27. In particular, the two light elements are actuated synchronously so that they both emit the same pattern.

The two light elements 76, 77 are in particular LEDs that can light up in a plurality of colours. In addition, the electronics 70 are designed to actuate the light device 75, i.e. the two light elements 76, 77 to reproduce at least one item of information in a luminous manner.

Figure 12:
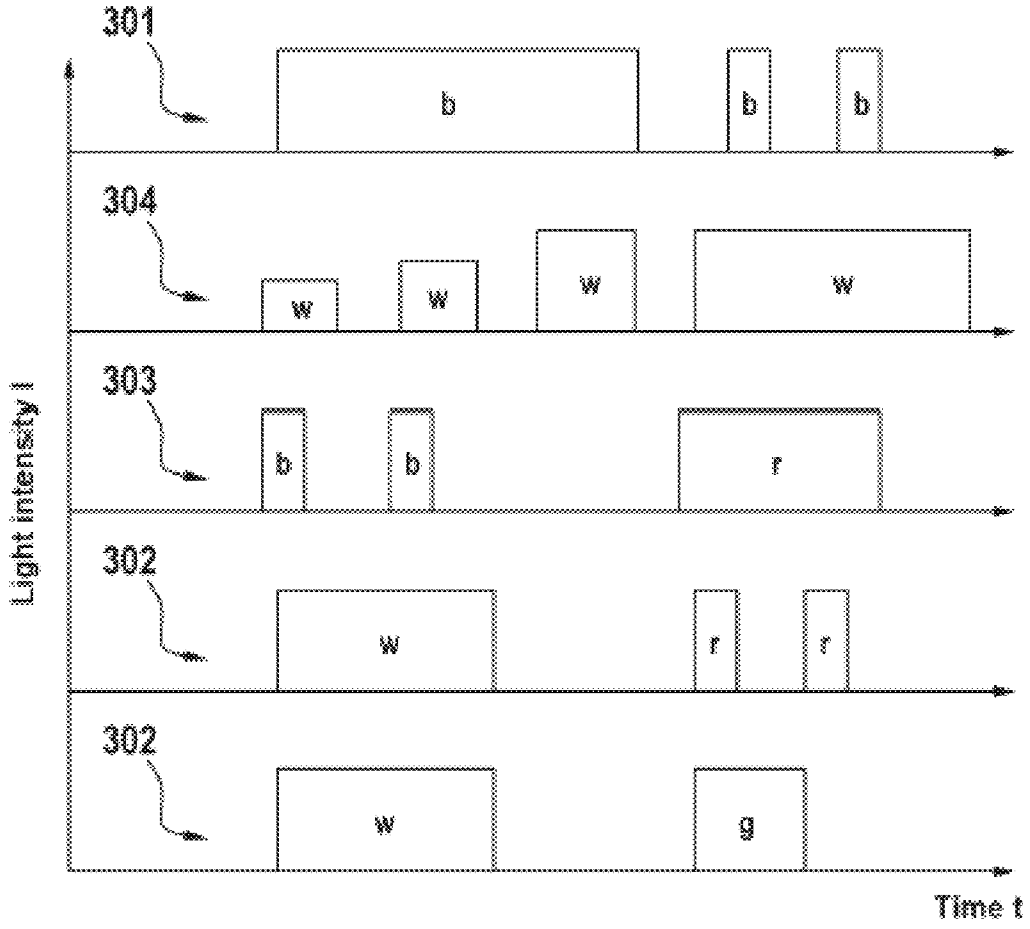

FIG. 12 shows an example of the patterns in terms of light colour, intensity and flashing pattern for different trigger events. Accordingly, blue light (b) with a flashing pattern "long", "short", "short" can be emitted, for example, when the button 73 is pressed 301. The "long" signal represents the connection set-up, the "short", "short" signals represent the existing connection.

When a charging cable 304 is connected to the socket 74, for example, white light (w) may be emitted, with both the light intensity and the duration of the individual light signals being able to increase over time. An interrupted pattern can represent the charging process and a sustained light can indicate that charging is complete.

When the key 1 is removed 303 from the locking device 101, for example, it can flash blue (b) twice and red (r) once, with the two blue light signals being short and the red light signal being long. The blue light signals indicate the connection to device 103. The red light signal indicates a fault.

For example, two different patterns representing a combination of information are provided for inserting 302 the key 1 into the locking device 101. In the combination "white" (w) "green" (g), "white" stands for a low charge status of the energy storage device and "green" for an access right. In the "white-red-red" combination, "white" stands for a low charge status of the energy storage device and "red-red" for a denial of an access right. If the energy storage device is sufficiently charged, the key will only emit the "green" pattern if access is granted and "red-red" if access is denied.

Figure 10:
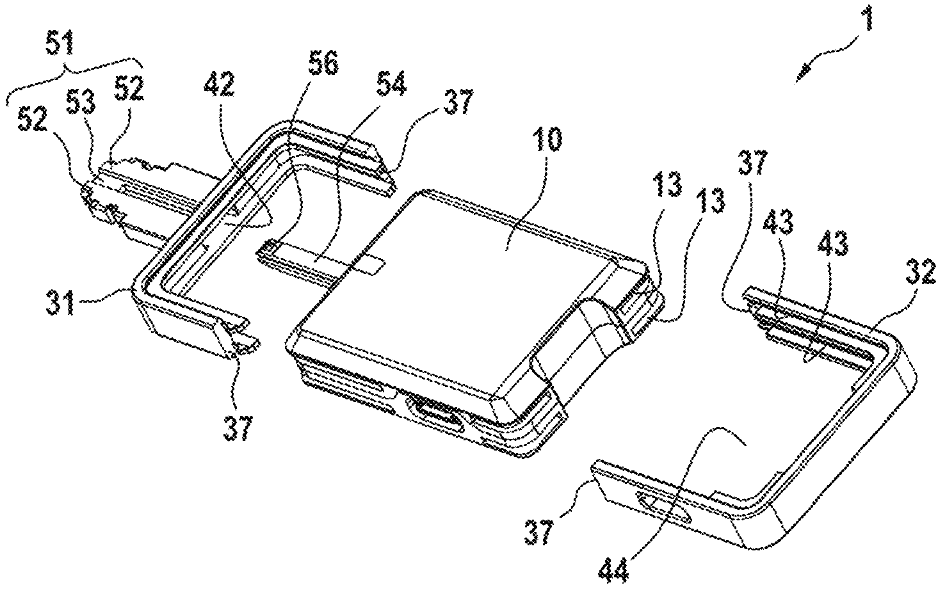

FIG. 10 illustrates a state during the assembly of the key 1 according to the disclosure. Accordingly, the two housing parts 11, 12 are first placed one on top of the other. The electronics 70, in particular also the energy storage device 85, are already located between the two housing parts 11, 12. Furthermore, the insert element 54 is inserted between the two housing parts 11, 12.

In order to press the two housing parts 11, 12 firmly onto one another and thereby in particular to compress the seal 28, the described rail holders 13 are provided in the two housing parts 11, 12, which are pushed into the associated rails 43 of the two frame parts 31, 32. The two frame parts 31, 32 can be pushed onto the housing 10 simultaneously or one after the other.

During this assembly process, the insert element 54 already connected to the housing 10 is inserted through an insert element through-opening 42 in the first frame part 31 and can thus be inserted between the two shank legs 52.

Figure 11:
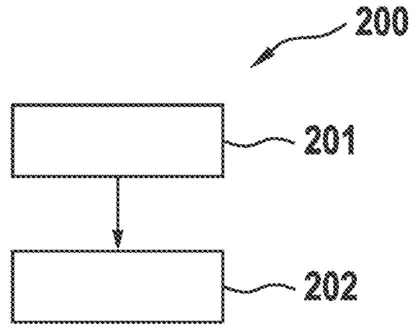

FIG. 11 illustrates an assembly method 200 for this exemplary embodiment. First, in an assembly method step a) 201, the electronics 70 and the energy storage device 85 are thereby surrounded by the housing 10. The housing 10 is then fastened to the frame 30 in an assembly method step b) 202. This can be done without bending the housing 10 or the circuit board 71.

In assembly method step b) 202, the rail holders 13 are pushed into one another with the rails 43 of the first frame element 31 and at the same time the insert element 54 is pushed into the key shank main body 51. The second frame element 32 is then pushed onto the housing 10, with the rails 43 of the second frame element 32 engaging in the rail holders 13 of the housing 10. At the end of the sliding movement, the second frame element 32 is fastened to the first frame element 31 by means of the latching connection 38, 39.

The invention claimed is:

1. A key for an electromechanical locking device, wherein a longitudinal axis, a width axis and a thickness axis are defined perpendicular to each other, with a key bow and with a key shank projecting along the longitudinal axis from the key bow for insertion into the locking device, wherein the key bow comprises an electrical energy storage device and/or electronics, wherein the key bow comprises a frame in which the energy storage device and/or the electronics is received, wherein the frame is rigidly connected to the key shank, and wherein the frame comprises at least one grip region which forms a top surface of the key bow for a user to grasp, wherein the key shank comprises a key shank main body, wherein the frame is monolithically connected to the key shank main body, wherein the key bow comprises a housing, wherein the housing is received by the frame, and wherein the housing forms a top surface of the key bow at opposing broad sides intersected by the thickness axis, wherein the frame extends around the thickness axis and wherein the frame forms a free space open on both sides for the arrangement of the housing, wherein the frame comprises at least a first frame part and a second frame part, wherein the first and second frame parts are connected to one another in a force-fitting and/or form-fitting manner at a connection point, wherein the key shank comprises an insert element, wherein the insert element is fastened to the key shank main body in a force-fitting and/or form-fitting manner.

2. The key according to claim 1, wherein the frame is made of metal.

3. The key according to claim 1, wherein the housing encloses the electronics and/or the energy storage device, wherein the housing comprises a first housing part and a second housing part, wherein the frame comprises at least one rail, wherein the at least one rail is designed to arrange the first housing part and the second housing part on one another.

4. The key according to claim 3, wherein the key comprises a socket for charging the energy storage device and/or for cable connection to the electronics, wherein the frame comprises a frame socket opening for the socket.

5. The key according to claim 4, wherein one of the housing parts comprises an enclosing housing socket opening for the socket.

6. The key according to claim 4, wherein the electronics comprise a circuit board on which the socket is arranged.

7. The key according to claim 1, wherein the insert element is arranged on at least one of the housing parts, wherein the insert element comprises at least one transmission element for transmitting electrical energy and/or electronic data to the locking device.

8. The key according to claim 7, wherein the key shank comprises at least two of the transmission elements for transmitting electrical energy and/or electronic data to the locking device, wherein the transmission elements are arranged symmetrically for reversible key-like usability.

9. The key according to claim 1, wherein the housing projects beyond the frame on both sides along the thickness axis.

10. The key according to claim 1, wherein the key bow comprises at least one light device, with at least one light element, and the housing comprises at least one light guide, wherein the at least one light guide, when viewed perpendicular to the thickness axis, projects beyond the frame.

11. The key according to claim 1, wherein a key ring through-opening for attaching the key to a key ring is formed between the frame and the housing.

12. An assembly method for assembling a key, wherein the key comprises a key bow and a key shank which is rigidly connected to the key bow, wherein the key bow comprises a housing, wherein the housing is received by a frame, and wherein the housing forms a top surface of the key bow at opposing broad sides intersected by the thickness axis, wherein the key shank comprises a key shank main body, wherein the frame is monolithically connected to the key shank main body, wherein the assembly method includes at least the following steps:

a. surrounding electronics and/or an electrical energy storage device of the key with the housing, and b. fastening the housing to the frame, wherein the frame comprises at least one grip region which forms a top surface of the key bow for a user to grasp, wherein the frame extends around the thickness axis and wherein the frame forms a free space open on both sides for the arrangement of a housing, wherein the housing is arranged, pushed in, on a first frame part and on a second frame part and the two frame parts are fastened to one another, and wherein when the housing is fastened to the frame, an insert element of the key shank is pushed into a key shank main body.

* * * * *